(12) United States Patent
Davenport et al.

(10) Patent No.: US 9,923,799 B2
(45) Date of Patent: Mar. 20, 2018

(54) DATA PROCESSING

(71) Applicant: Metaswitch Networks Ltd, Enfield (GB)

(72) Inventors: Casey Davenport, San Francisco, CA (US); Simon Wingrove, San Francisco, CA (US); Alex Pollitt, San Francisco, CA (US); Michael Curtis, San Francisco, CA (US); Shaun Crampton, San Francisco, CA (US); Steve Balls, Enfield (GB); Fiona Corden, Enfield (GB)

(73) Assignee: METASWITCH NETWORKS LTD., Enfield (GB)

( * ) Notice: Subject to any disclaimer, the term of this patent is extended or adjusted under 35 U.S.C. 154(b) by 41 days.

(21) Appl. No.: 14/262,631

(22) Filed: Apr. 25, 2014

(65) Prior Publication Data

US 2015/0312149 A1    Oct. 29, 2015

(51) Int. Cl.
*H04L 12/751* (2013.01)
*H04L 12/717* (2013.01)
*H04L 12/741* (2013.01)

(52) U.S. Cl.
CPC .............. *H04L 45/02* (2013.01); *H04L 45/42* (2013.01); *H04L 45/74* (2013.01)

(58) Field of Classification Search
CPC ....... H04L 45/745; H04L 45/02; H04L 61/10; H04L 29/12009; H04L 45/28;
(Continued)

(56) References Cited

U.S. PATENT DOCUMENTS 7,369,556 B1 * 5/2008 Rekhter ............... H04L 12/465
370/392
8,615,015 B1 * 12/2013 Shekhar ................ H04L 45/54
370/256
(Continued)

FOREIGN PATENT DOCUMENTS

CN          101714942 A     5/2010
CN          102801567 A     11/2012
(Continued)

OTHER PUBLICATIONS

Yang, "Load Switch Command Including Identification of Source Server Cluster and Target Server Cluster", CN, CN201310231992.4, English machine translation.*
(Continued)

*Primary Examiner* — Paul H Masur
*Assistant Examiner* — Michael Phillips
(74) *Attorney, Agent, or Firm* — EIP US LLP

(57) ABSTRACT

Measures for processing data in a packet-switched network. At a first device in the network, a packet transmitted from a second device in the network is received. The received packet comprising an Internet Protocol (IP) address for a third device in the network. On the basis of the IP address for the third device comprised in the received data packet, lookup in an IP routing table of the second device is initiated to obtain a next-hop address for the received packet. The obtained next-hop IP address is determined to be an IP address of a device connected to the first device.

23 Claims, 13 Drawing Sheets

(58) Field of Classification Search
CPC ......... H04L 45/54; H04L 45/60; H04L 45/20; H04L 41/12; H04L 45/26; H04L 29/12018; H04L 45/74; H04L 69/22; H04L 12/4645; H04L 2012/445; H04L 45/66; H04L 49/351; H04L 61/6022; H04L 61/103; H04L 45/42; H04L 49/70; H04L 49/25; H04W 8/26; H04W 40/24

See application file for complete search history.

(56) References Cited

U.S. PATENT DOCUMENTS

| | | | | |
|---|---|---|---|---|
| 8,638,789 | B1* | 1/2014 | Pani | H04L 45/16 370/390 |
| 2003/0016672 | A1* | 1/2003 | Rosen | H04L 12/4645 370/392 |
| 2003/0110240 | A1* | 6/2003 | Lockridge | H04L 12/2602 709/220 |
| 2004/0120329 | A1 | 6/2004 | Chung et al. | |
| 2008/0175251 | A1 | 7/2008 | Oouchi et al. | |
| 2011/0286326 | A1* | 11/2011 | Awano | H04L 45/42 370/225 |
| 2012/0127999 | A1* | 5/2012 | Grosser, Jr. | H04L 45/245 370/392 |
| 2013/0044636 | A1* | 2/2013 | Koponen | H04L 47/12 370/254 |
| 2014/0064270 | A1* | 3/2014 | Kapadia | H04L 12/4675 370/389 |
| 2014/0119367 | A1* | 5/2014 | Han | H04L 12/4633 370/389 |
| 2014/0198794 | A1* | 7/2014 | Mehta | H04L 45/74 370/392 |
| 2014/0317251 | A1* | 10/2014 | Hallivuori | H04L 41/0823 709/221 |
| 2014/0334286 | A1* | 11/2014 | Ernstrom | H04L 45/04 370/216 |
| 2015/0071289 | A1* | 3/2015 | Shin | H04L 45/745 370/392 |
| 2015/0092776 | A1* | 4/2015 | Wijnands | H04L 45/507 370/392 |
| 2015/0117451 | A1* | 4/2015 | Kaneriya | H04L 45/745 370/392 |
| 2015/0131663 | A1* | 5/2015 | Brar | H04L 45/745 370/392 |
| 2015/0263947 | A1* | 9/2015 | Ortacdag | H04L 45/745 370/389 |
| 2015/0288595 | A1* | 10/2015 | Suzuki | H04L 45/42 370/254 |
| 2016/0036706 | A1* | 2/2016 | Hiscock | H04L 12/462 370/230 |
| 2016/0112503 | A1* | 4/2016 | Yang | H04L 12/6418 709/223 |

FOREIGN PATENT DOCUMENTS

| | | | |
|---|---|---|---|
| CN | 201310231992.4 | * | 6/2013 |
| EP | 1511248 | A3 | 4/2006 |
| EP | 2030410 | B1 | 12/2010 |
| KR | 1020130109342 | * | 9/2013 |
| WO | 01/20875 | A1 | 3/2001 |
| WO | 2007/041926 | A1 | 4/2007 |
| WO | 2007/060056 | A1 | 5/2007 |
| WO | 2009/045271 | A2 | 4/2009 |
| WO | 2013/096678 | A2 | 6/2013 |

OTHER PUBLICATIONS

Shin et al., "System and Method for Address Resolution", KR, KR1020130109342, English machine translation.*

Thayumanavan Sridhar et al., "Layer 2 and Layer 3 Switch Evolution," The Internet Protocol Journal, vol. 1, No. 2, Sep. 1998 (4 pages).

* cited by examiner

DATA PROCESSING

BACKGROUND OF THE INVENTION

Field of the Invention

The present application relates to data processing. In particular, but not exclusively, the present application relates to processing data in a packet-switched network.

Description of the Related Technology

FIG. 1 shows a known packet-switched network 100, for example an Internet Protocol (IP) network. Network 100 contains a number of devices which operate an IP (for example IP version 4 (IPv4) or IP version 6 (IPv6)), in this example, device 104 and device 106. Devices such as device 104 and device 106 may be referred to as 'IP-speakers' as they operate (or 'speak') an IP in the network. Devices 104 and 106 may for example comprise network nodes such as routers or endpoint devices such as user terminals. Network 100 also contains a device 102, for example a Layer 2 (L2) switch, located between device 104 and device 106.

It is common to use a L2 switch such as device 102 to allow multiple IP-speakers to be connected together, for example devices 104, 106, 108 and 110 as shown in packet-switched network 200 depicted in FIG. 2. L2 switch 102 facilitates the IP connection between IP-speaker devices 104, 106, 108 and 110, by forwarding packets between IP-speaker devices 104, 106, 108 and 110 accordingly, whilst remaining 'invisible' to IP-speaker devices 104, 106, 108 and 110. By 'invisible' here it is meant that devices 104, 106, 108 and 110 are not aware of the existence of L2 switch 102 from an IP perspective. To do this, L2 switch 102 will examine the L2 header at the top of packets it receives.

A packet which L2 switch 102 receives will contain a source media access control (MAC) address which refers to the connected IP-speaking device (for example device 106) that originates the packet. The destination MAC address is the connected IP-speaking device (for example device 104) that the packet should be passed to by device 102. For most data flows, L2 switch 102 does not alter the packet flowing through it, but uses the data in the L2 header to decide where to send the packet. L2 switch 102 may store information from this L2 header for use in future packet forwarding decisions.

To make its forwarding decision, L2 switch 102 does not need to examine the IP header (located at Layer 3 (L3), or 'IP layer') which is located underneath the L2 header. Therefore, it is not required that L2 switch 102 knows the IP addresses of the IP-speakers connected to it. By 'connected to' here, it is meant directly connected to without any other devices in-between.

The source and destination IP addresses in a packet do not refer to the connected IP-speakers, but the ultimate source and ultimate destination of the packet. A packet may pass through multiple IP-speaking devices on its journey from the source to the destination. Therefore, L2 switch 102 cannot easily determine the IP addresses of its connected IP-speakers from the packets passing through it.

Existing methods for learning addressing information are unsuitable for various reasons, for example because they:

provide L2 information given L3 information (for example using the Address Resolution Protocol (ARP));

provide L3 information given a hostname (for example using the domain name system (DNS) lookup);

assume things about the network as a whole, and do not provide 'invisibility' at L3 required of a L2 switch (for example using the Open Shortest Path First (OSPF) protocol, the Intermediate System to Intermediate System (IS-IS) protocol, and/or the Routing Information Protocol (RIP)); or require the querier (i.e. the device that wants to learn the IP addresses of its connected IP-speakers) to be an IP-speaker (for example using OSPF, the Border Gateway Protocol (BGP), and/or RIP).

A sufficiently advanced L2 switch may want to know L3 information such as IP addresses of the IP-speakers directly connected to it, so that it can provide extra function. However, it is not expected that a network administrator should have to configure such information on a L2 switch. Therefore, it would be desirable for a L2 switch to be able to learn the L3 information such as IP addresses of its connected IP-speakers itself, including doing so whilst maintaining 'invisibility' at the IP layer.

SUMMARY

According to a first embodiment, there is a method of processing data in a packet-switched network, the method comprising: receiving, at a first device in the network, a packet transmitted from a second device in the network, the received packet comprising an Internet Protocol (IP) address for a third device in the network; initiating lookup, on the basis of the IP address for the third device comprised in the received data packet, in an IP routing table of the second device to obtain a next-hop address for the received packet; and determining the obtained next-hop IP address to be an IP address of a device connected to the first device.

According to a second embodiment, there is a system for use in processing data in a packet-switched network, the system comprising at least one processor, and at least one memory including computer program code, the at least one memory and the computer program code being configured to, with the at least one processor, cause the system at least to: receive, at a first device in the network, a packet transmitted from a second device in the network, the received packet comprising an Internet Protocol (IP) address for a third device in the network; initiate lookup, on the basis of the IP address for the third device comprised in the received data packet, in an IP routing table of the second device to obtain a next-hop address for the received packet; and determine the obtained next-hop IP address to be an IP address of a device connected to the first device.

According to a third embodiment, there is a computer program product comprising a non-transitory computer-readable storage medium having computer readable instructions stored thereon, the computer readable instructions being executable by a computerized device to cause the computerized device to perform a method for processing data in a packet-switched network, the method comprising: receiving, at a first device in the network, a packet transmitted from a second device in the network, the received packet comprising an Internet Protocol (IP) address for a third device in the network; initiating lookup, on the basis of the IP address for the third device comprised in the received data packet, in an IP routing table of the second device to obtain a next-hop address for the received packet; and determining the obtained next-hop IP address to be an IP address of a device connected to the first device.

Further features of embodiments will become apparent from the following description of preferred embodiments, given by way of example only, which is made with reference to the accompanying drawings.

DETAILED DESCRIPTION OF CERTAIN INVENTIVE EMBODIMENTS

Figure 1:
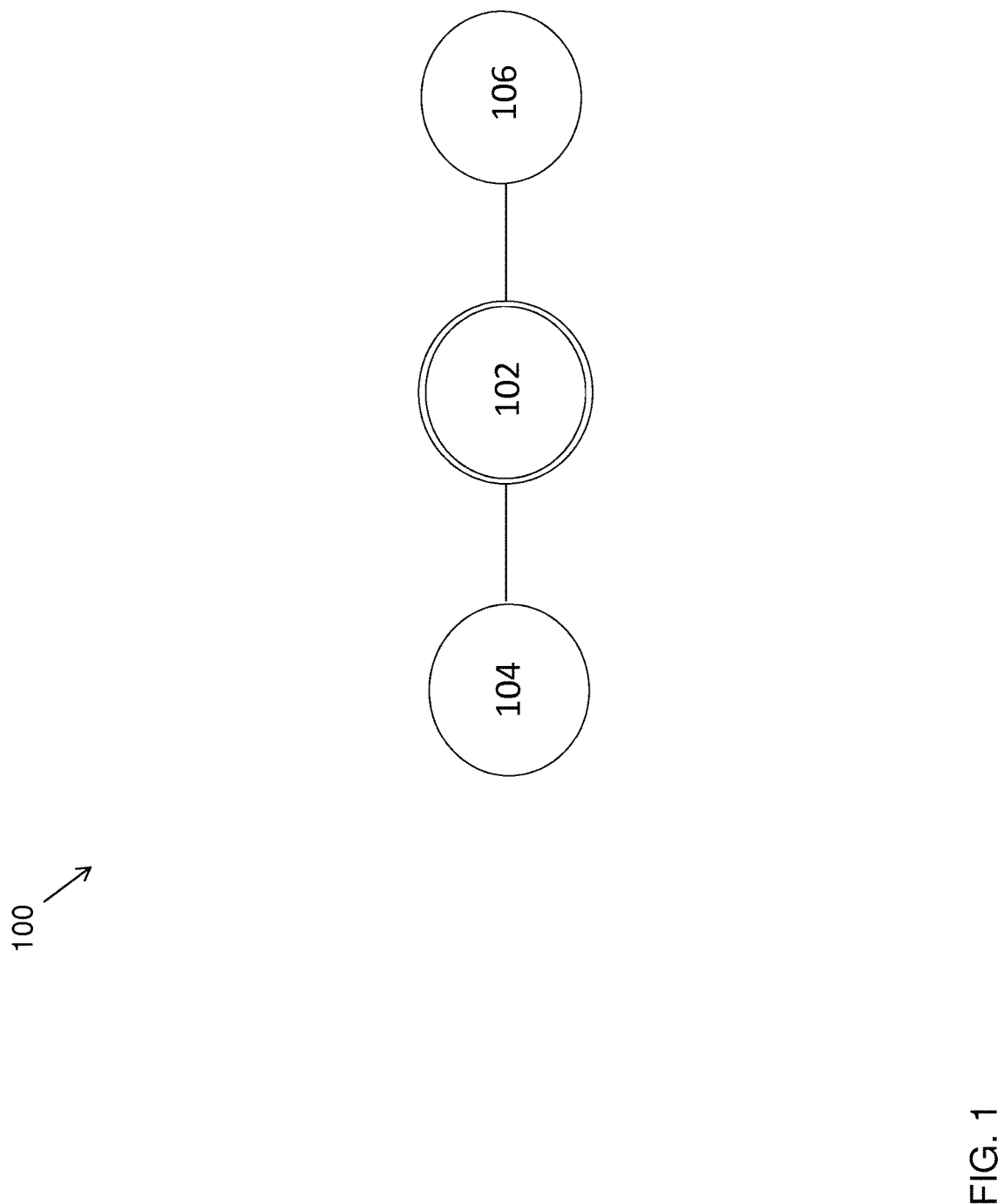
FIG. 1 shows a packet-switched network according to the prior art.
Figure 2:
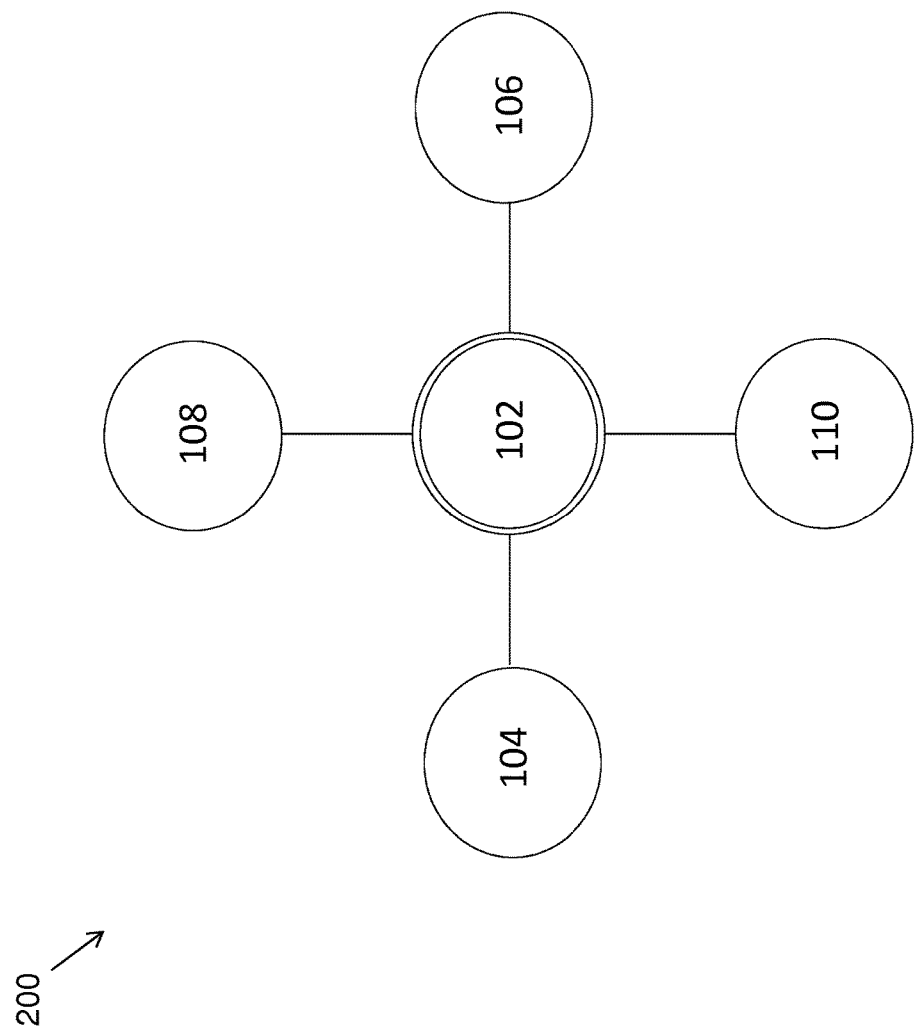
FIG. 2 shows a packet-switched network according to the prior art.
Figure 3:
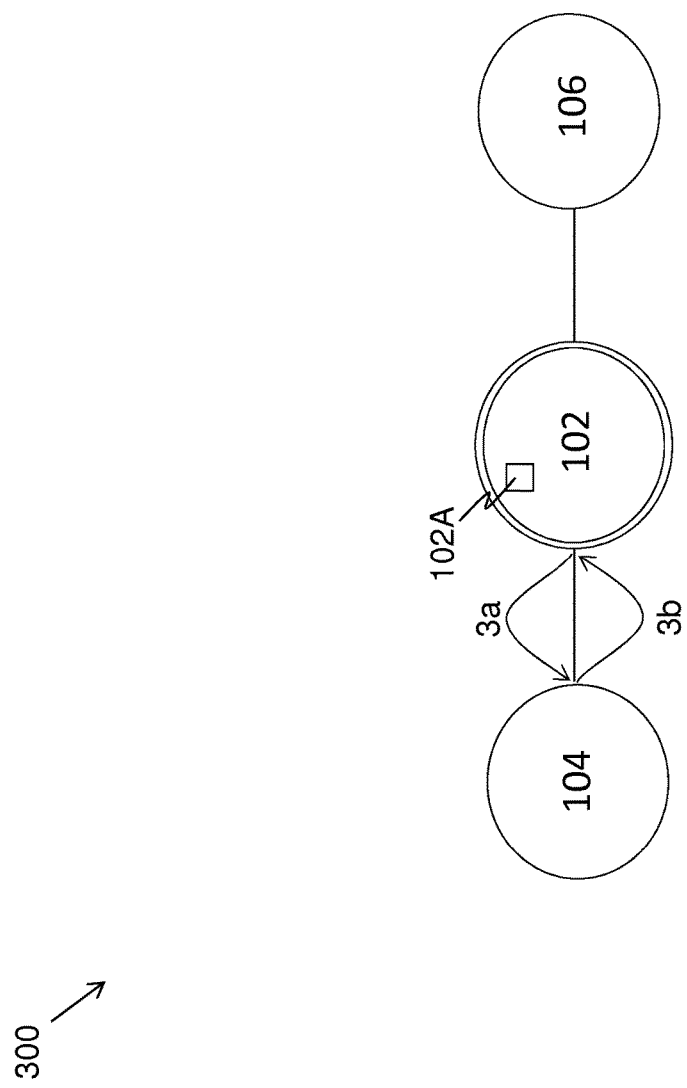
FIG. 3 shows a packet-switched network according to one or more disclosed embodiments.

FIG. 3 shows a packet-switched network 300 according to embodiments. Packet-switched network 300 comprises a device 102 connected to devices 104 and 106. Device 102 comprises a processor and/or memory 102A for carrying out various data processing tasks and/or for providing data storage according to embodiments. In embodiments, device 102 comprises a device which does not operate an IP in the network. In embodiments, device 102 comprises a L2 switch. In embodiments, one, the other or both of device 104 and device 106 comprise devices which operate an IP in the network. In embodiments, one, the other or both of device 104 and device 106 comprise L3 devices. In embodiments, device 102 is directly connected to devices 104 and 106 in the network. Network 300 may comprise other devices (not shown).

In first 'protocol origination' embodiments, device 102 generates and transmits one or more requests, for example a broadcast ping, which accord with an existing IP protocol. Any response(s) which device 102 then receives can then be used to discover the IP addresses of its connected IP-speakers.

In embodiments, device 102 remains "invisible" at the IP layer, and therefore is not given an IP address of which neighbor devices are aware of with which to speak this IP protocol. In embodiments, to remain "invisible" to other devices in the IP network, device 102 does not use its own IP address, but instead uses a randomly generated unique address which is routable (if such an address can be found), a broadcast address, or the IP address of another IP-speaker which has already been discovered. In embodiments, device 102 intelligently filters out responses including a predetermined identifier to prevent the IP-speakers which are not themselves being queried from noticing any response. In embodiments, the predetermined identifier is an identifier associated with device 102. By filtering out responses which were generated in response to requests which were originated by device 102 itself, device 102 is able to remain invisible in the network whilst discovering the IP addresses of its connected IP-speakers.

Figure 4:
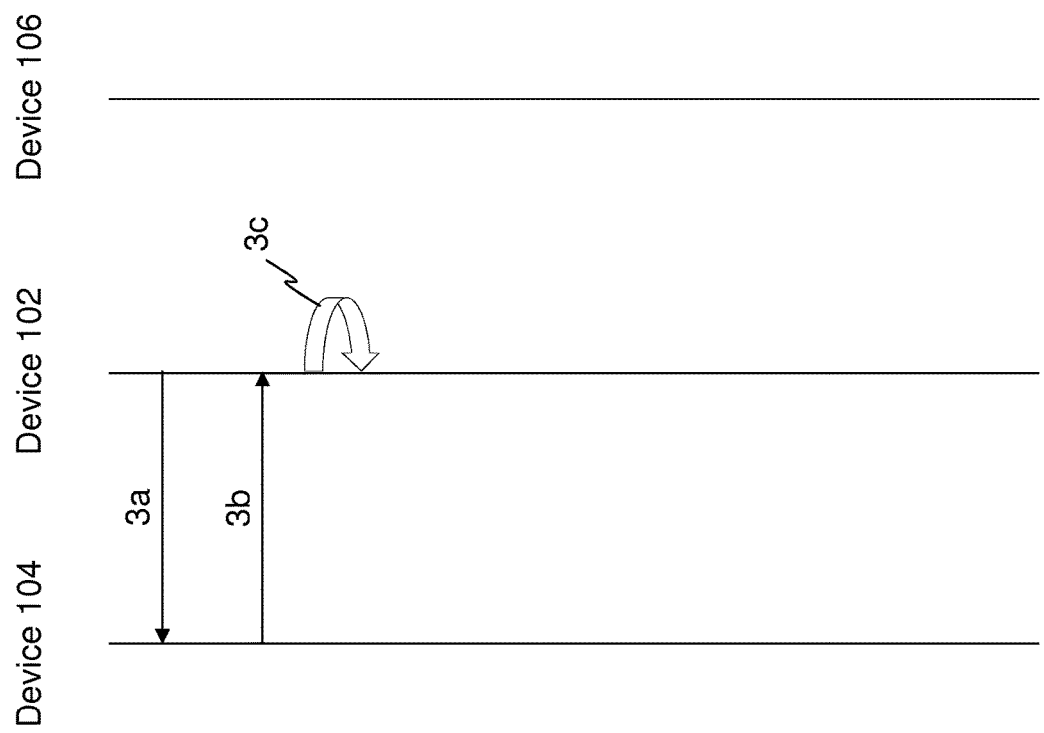
FIG. 4 shows a flow diagram according to one or more disclosed embodiments.

FIG. 3 depicts a request being transmitted from device 102 to device 104 as per item 3a. In these embodiments, device 104 responds to the request by transmitting a response back to device 102 as per item 3b. FIG. 4 shows a flow diagram involving processing of data according to such embodiments.

In step 3a, device 102 transmits an echo request packet into the network, the echo request packet comprising a predetermined identifier. In step 3b, device 104 responds to the request by transmitting an echo response packet back to device 102 in step 3b. When device 102 receives the echo response packet of step 3b from device 104, device 102 determines whether the echo response packet comprises the predetermined identifier.

In the embodiments of FIGS. 3 and 4, the echo response packet received by device 102 does comprise the predetermined identifier, so in step 3c, device 102 identifies the received echo response packet as a packet generated on the basis of an echo request packet originated from device 102. Device 102 thus determines an IP address comprised in the received echo response packet to be an IP address of device 104. In embodiments, in response to the received echo response packet comprising the predetermined identifier, device 102 does not forward the received echo response packet on towards another device in the network, i.e. device 102 filters out the response message and it is not forwarded on to any other devices in the network. Such embodiments therefore allow device 102 to discover the IP address of device 104 connected to it, whilst also allowing device 102 to remain invisible at L3 in the network.

In embodiments, device 102 transmitting an echo request packet comprises device 102 pinging a broadcast address in the network.

In embodiments, the IP address comprised in the received echo response packet of step 3b comprises a source address of the received echo response packet; in this case, the source address corresponds to an IP address of device 104.

In embodiments, device 102 does not use an address associated with itself in echo request packet of step 3a. In embodiments, the echo request packet of step 3a comprises an IP address associated with device 106; for example, the echo request packet of step 3a may comprise a source IP address for already discovered device 106. In such embodiments, device 102 avoids becoming visible in the network by using a source address associated with another device in the network, in this case device 106; in other embodiments, device 102 may instead use a randomly generated unique address, a broadcast address, etc.

Some embodiments are facilitated by use of Internet Control Message Protocol (ICMP) Echo identifiers, which allow device 102 to uniquely identify packets it has originated so that they can be removed from the transmission wire by device 102, whilst simultaneously allowing existing ICMP Echo packets to flow through device 102 and not be intercepted.

In embodiments, the echo request packet of step 3a comprises an Internet Control Message Protocol (ICMP) echo request packet and the identifier comprises an ICMP Echo identifier.

Figure 5:
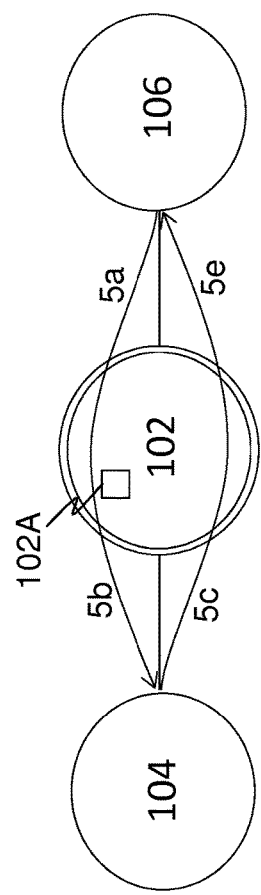
FIG. 5 shows a packet-switched network according to one or more disclosed embodiments.
Figure 6:
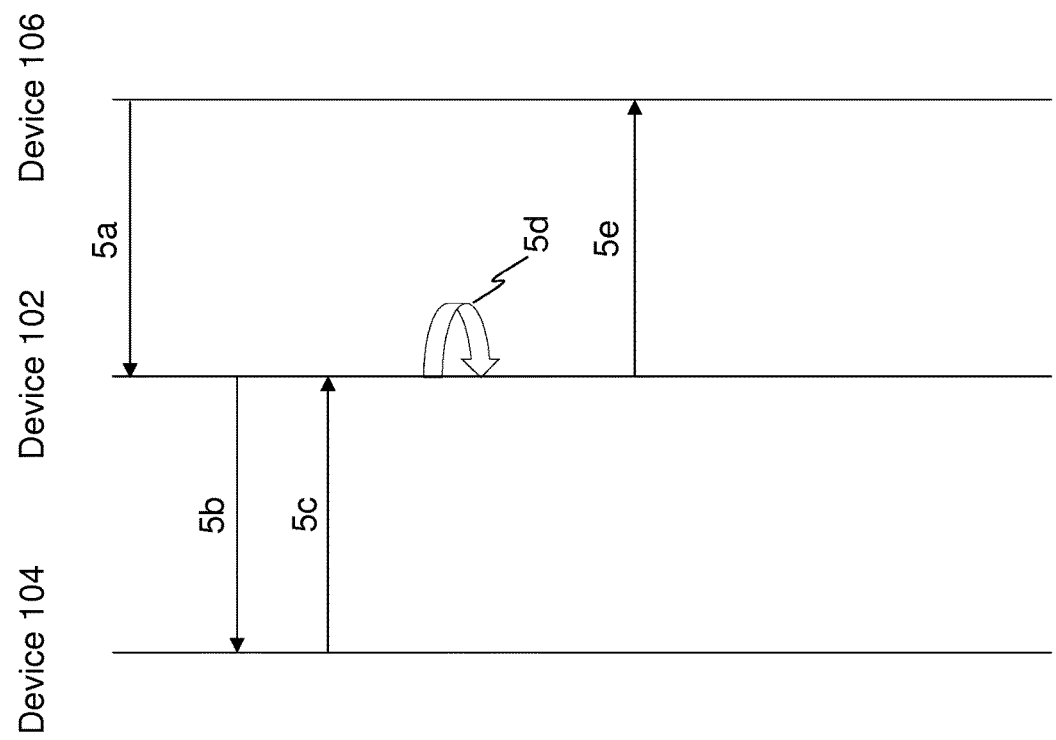
FIG. 6 shows a flow diagram according to one or more disclosed embodiments.

FIG. 5 depicts an echo request packet being transmitted from device 106 to device 102 in step 5a. In these embodiments, device 102 forwards the echo request packet on to device 104 in step 5b. Device 104 responds to the echo request packet by transmitting an echo response packet to device 102 in step 5c. In these embodiments, device 102 does not recognize a predetermined identifier (for example an ICMP Echo identifier) in the echo response packet, so does not filter out the response packet; device 102 therefore forwards the echo response packet on to device 106 in step 5e. FIG. 6 shows a flow diagram involving processing of data according to such embodiments.

When device 102 receives the echo response packet of step 5c from device 104, device 102 determines whether the echo response packet comprises the predetermined identifier (i.e. determines whether it recognizes a predetermined identifier associated with an echo request originated by itself). In the embodiments of FIGS. 5 and 6, the echo response packet received by device 102 does not comprise the predetermined identifier, so in step 5d device 102 identifies that the received echo response packet of step 5c is a packet not generated on the basis of an echo request packet originated from device 102. Device 102 therefore forwards the received echo response packet of 5c on towards device 106 in step 5e.

Figure 7:
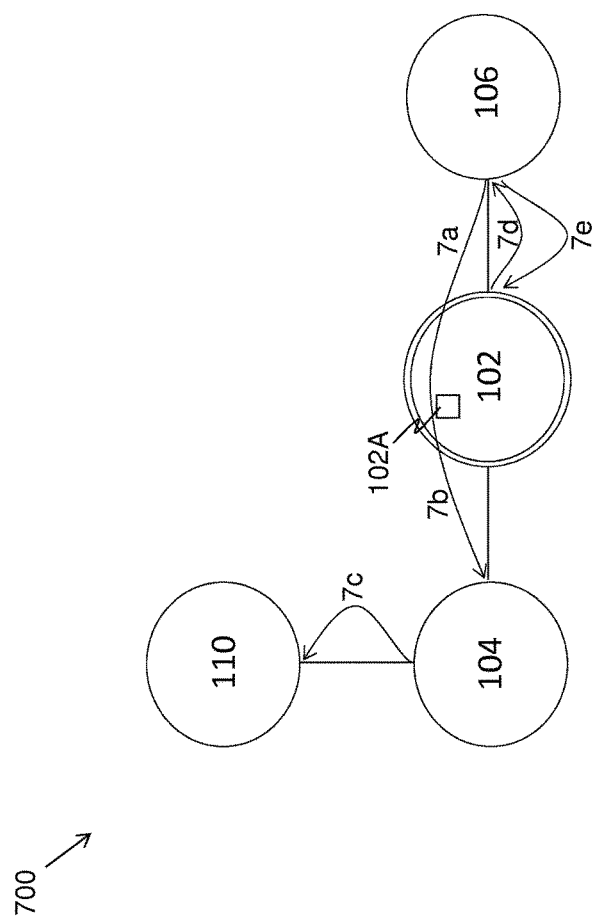
FIG. 7 shows a packet-switched network according to one or more disclosed embodiments.

FIG. 7 shows a packet-switched network 700 according to embodiments. Packet-switched network 700 comprises a device 102 connected to devices 104 and 106, as well as a device 110 connected to device 104. In these embodiments, device 102 is directly connected to devices 104 and 106, but is only connected to device 110 via device 104, i.e. device 110 is reachable by device 102 in the network via device 104. Device 102 comprises a processor and/or memory 102A for carrying out various data processing tasks and/or for providing data storage according to embodiments. In embodiments, device 102 comprises a device which does not operate an IP in the network. In embodiments, device 102 comprises a L2 switch. In embodiments, one or more of devices 104, 106 and 110 comprise devices which operate an IP in network 700. In embodiments, one or more of devices 104, 106 and 110 comprise L3 devices. Network 700 may comprise other devices (not shown).

In second 'data packet snooping' embodiments, device 102 inspects data packets as they pass through it. In embodiments, a data packet may be received and inspected via a packet snooping operation. The data packets may for example comprise data packets which contain payload data.

Inspecting such a data packet will not necessarily reveal the IP address of the directly connected IP-speaker (for example device 104) but it will reveal an IP address (for example as a destination address of the data packet) of an IP-speaker (for example device 110) that is reachable from the directly connected IP-speaker (in this example device 104). In such embodiments, in order to obtain the IP addresses of its directly connected IP-speakers, device 102 requires more information than the IP addresses of reachable (i.e. non-directly connected) nodes.

In embodiments, the IP routing table of the source IP-speaker (i.e. the device from where a given data packet arrives) is used to perform an IP address lookup on an IP address comprised in the given (received) data packet (for example the destination IP address of the given data packet) and obtain a next-hop address. The obtained next hop address is the IP address of the receiving (i.e. the device to where the given data packet is forwarded by device 102) directly-connected IP speaker.

Figure 8:
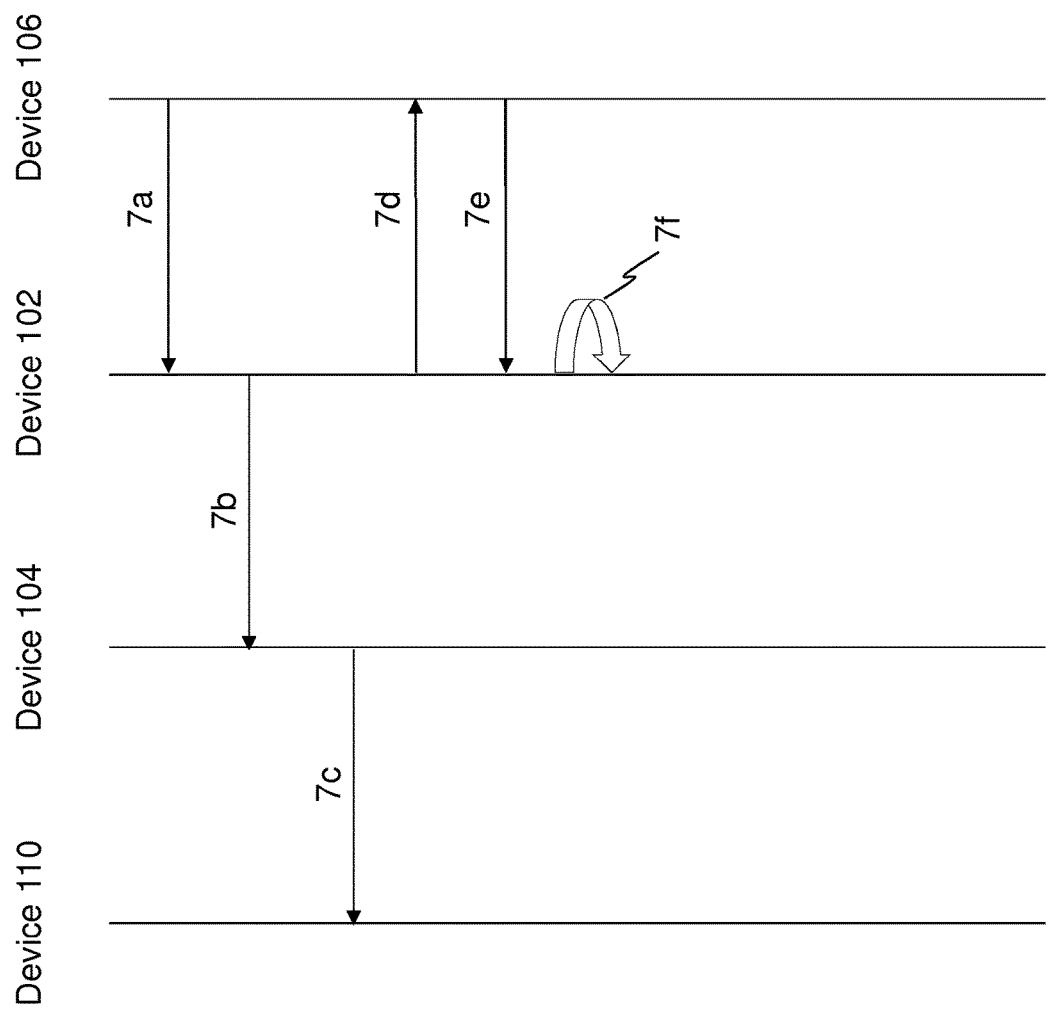
FIG. 8 shows a flow diagram according to one or more disclosed embodiments.

FIG. 7 depicts embodiments where a data packet is transmitted from device 106, received at device 102 in step 7a and then forwarded on to device 104 by device 102 in step 7b. The data packet is then transmitted from device 104 to device 110 in step 7c. In these embodiments, a lookup in the routing table of device 106 is performed in steps 7d and 7e. FIG. 8 shows a flow diagram involving processing of data according to such embodiments.

In step 7a, a data packet transmitted from device 106 is received at device 102, the received packet comprising an IP address for device 110. In embodiments, the IP address comprised in the received packet comprises a destination address for the received packet, i.e. the destination of the packet is device 110. The data packet is forwarded on by device 102 to device 104 in step 7b and then on to device 110 by device 104 in step 7c.

In step 7d, device 102 initiates lookup, on the basis of the IP address for device 110 comprised in the data packet received in step 7a, in an IP routing table of device 106 to obtain a next-hop address for the received packet in step 7e. In step 7f, device 102 determines the obtained next-hop IP address to be an IP address of device 104 connected to device 102.

Such embodiments therefore allow device 102 to discover the IP address of device 104 connected to it, whilst also allowing device 102 to remain invisible at L3 in the network.

In the embodiments of FIGS. 7 and 8 described above, device 104 connected to device 102 comprises a different device to device 110; in such embodiments, device 110 is reachable in the network from device 104 connected to device 102.

In alternative embodiments, instead of device 110 being reachable in the network from device 104 (which is connected to device 102), device 104 comprises the same device as device 110.

In the embodiments depicted in FIGS. 7 and 8, the initiation and determination are performed by device 102. In embodiments, device 102 has access to the IP routing table of device 106 such that the initiating comprises transmitting a lookup request from device 102 to device 106.

In further 'data packet snooping' embodiments, device 102 (for example a standard L2 switch) does not have access to the IP routing tables of its directly connected IP speakers. However, in a network where a plurality of devices (for example L2 switches) are software defined networking (SDN) controlled, an SDN controller device (or 'node') may be able to obtain this information. Such an SDN controller device can then use this information, together with data packets snooped by a device such as device 102, to provide device 102 with the IP addresses of its directly-connected nodes.

Figure 9:
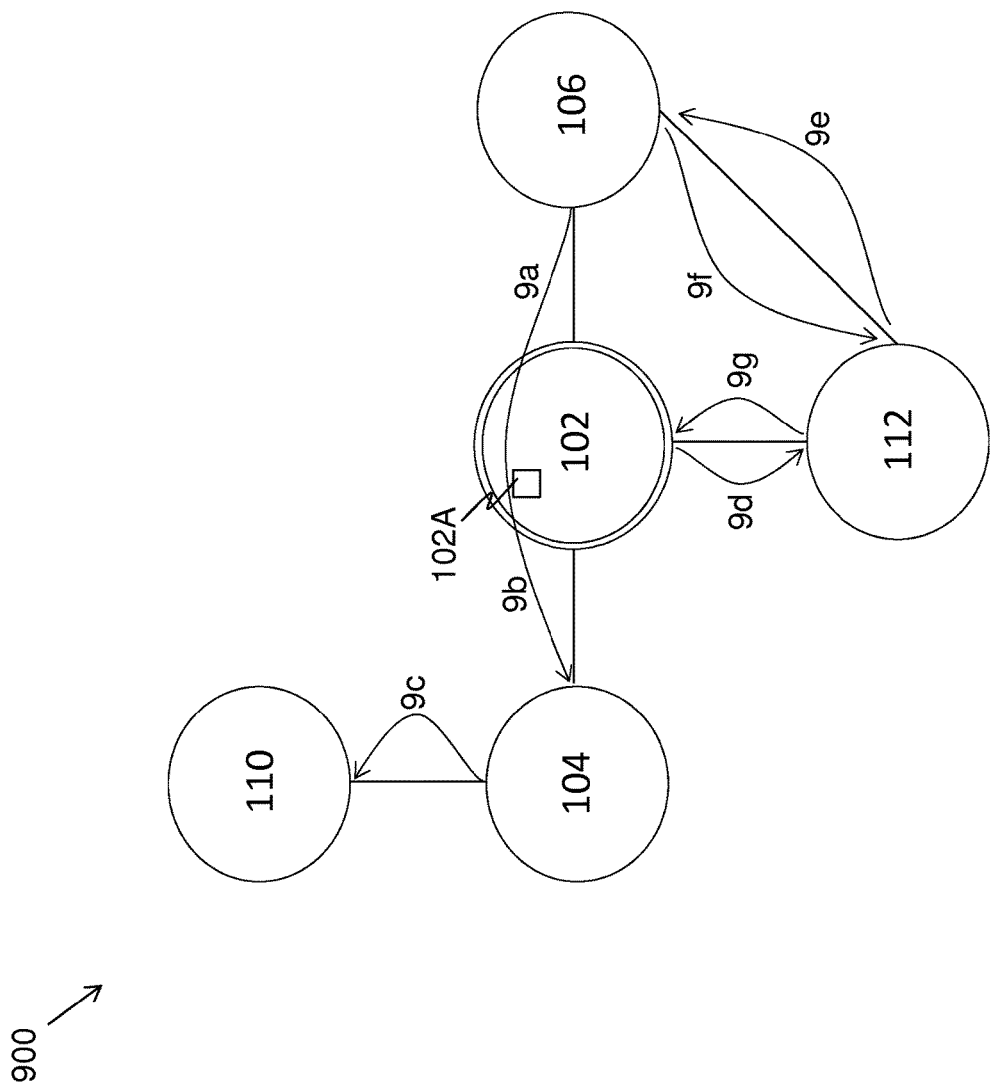
FIG. 9 shows a packet-switched network according to one or more disclosed embodiments.
Figure 10:
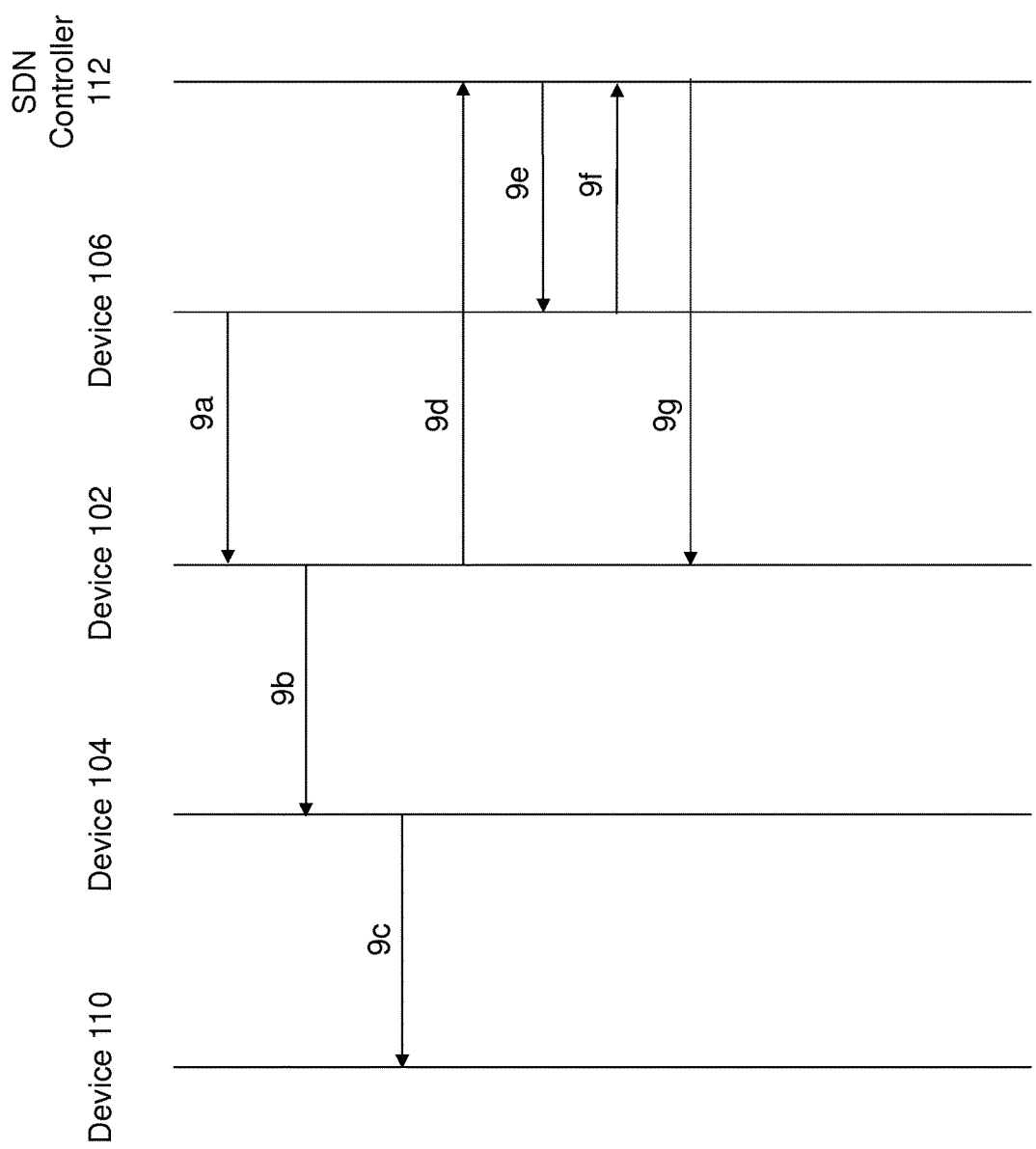
FIG. 10 shows a flow diagram according to one or more disclosed embodiments.

FIG. 9 depicts such further 'data packet snooping' embodiments where a data packet transmitted from device 106 is received at device 102 in step 9a and then forwarded on to device 104 by device 102 in step 9b. The packet is then transmitted from device 104 to device 110 in step 9c. In these embodiments, a lookup in the routing table of device 106 is performed by SDN controller 112 in steps 9e and 9f. FIG. 10 shows a flow diagram involving processing of data according to such embodiments.

In step 9a, a data packet transmitted from device 106 is received at device 102, the received packet comprising an IP address for device 110. In embodiments, the IP address comprised in the received packet comprises a destination address for the received packet, i.e. the destination of the packet is device 110. The data packet is forwarded on by device 102 to device 104 in step 9b and then on to device 110 by device 104 in step 9c.

In step 9d, device 102 initiates lookup, on the basis of the IP address for device 110 comprised in the data packet received in step 9a, in an IP routing table of device 106 to obtain a next-hop address for the received packet. In embodiments, device 102 does not have access to the IP routing table of device 106. However, in such embodiments, SDN controller device 112 does have access to the IP routing table of device 106.

In embodiments, the initiating comprises device 102 transmitting a lookup request to SDN controller device 112 in step 9*d*. In embodiments, the lookup request transmitted to SDN controller device 112 from device 102 comprises the IP address for device 106.

Upon receipt of the lookup request of 9*d*, SDN controller performs a lookup in step 9*e* of the IP routing table of device 106 to obtain a next-hop address for the received packet in step 9*f*. In embodiments, the determination is performed at SDN controller device 112 and SDN controller device 112 then provides device 102 with the obtained next-hop IP address, i.e. that of its directly connected IP-speaker device 104 in step 9*g*.

Such embodiments therefore allow device 102 to discover the IP address of device 104 connected to it, whilst also allowing device 102 to remain invisible at L3 in the network.

Figure 11:
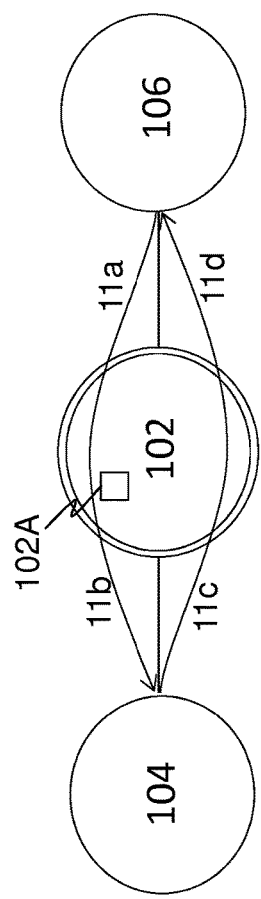
FIG. 11 shows a packet-switched network according to one or more disclosed embodiments.

FIG. 11 shows a packet-switched network 1100 according to embodiments. Packet-switched network 1100 comprises a device 102 connected to devices 104 and 106. Device 102 comprises a processor and/or memory 102A for carrying out various data processing tasks and/or for providing data storage according to embodiments. In embodiments, device 102 comprises a device which does not operate an IP in the network. In embodiments, device 102 comprises a L2 switch. In embodiments, one, the other or both of device 104 and device 106 comprise devices which operate an IP in the network. In embodiments, one, the other or both of device 104 and device 106 comprise L3 devices. In embodiments, device 102 is directly connected to devices 104 and 106 in the network. Network 1100 may comprise other devices (not shown).

In third 'control packet snooping' embodiments, it is known that there is a control plane protocol (a 'predetermined control plane protocol') being spoken directly between the connected IP speakers. This means that packets generated according to the predetermined control plane protocol will contain the IP addresses of the IP speakers in them. In embodiments, the predetermined control plane protocol employed is Address Resolution Protocol (ARP) as it is a commonly used control plane protocol in IP networks. In alternative embodiments, less commonly used control plane protocols such as OSPF, BGP, or RIP could be used.

In some embodiments, the predetermined control plane protocol comprises the Address Resolution Protocol (ARP) and the extracted Layer 3 information comprises an IP version 4 (IPv4) address. In other embodiments, the predetermined control plane protocol comprises the Neighbor Discovery Protocol (NDP) and the extracted Layer 3 information comprises an IP version 6 (IPv6) address.

In embodiments, packets generated according to the predetermined control plane protocol are sent from one IP speaker to another IP speaker via device 102 at L2. However, control plane protocol request and control plane protocol response messages contain L3 information (for example IP addresses) associated with the directly connected devices (such as devices 104 and 106) along with L2 information (for example MAC addresses) associated with the directly connected devices. By snooping this L3 information according to embodiments, it is possible to learn the IP addresses of directly connected nodes.

FIG. 11 depicts embodiments where a packet (for example a request packet) generated according to a predetermined control plane protocol is transmitted from device 106, received at device 102 in step 11*a* and then forwarded on to device 104 by device 102 in step 11*b*. A packet generated according to the predetermined control plane protocol (for example a response packet) is then transmitted from device 104, received at device 102 in step 11*c* and then forwarded on to device 106 by device 102 in step 11*d*.

Figure 12:
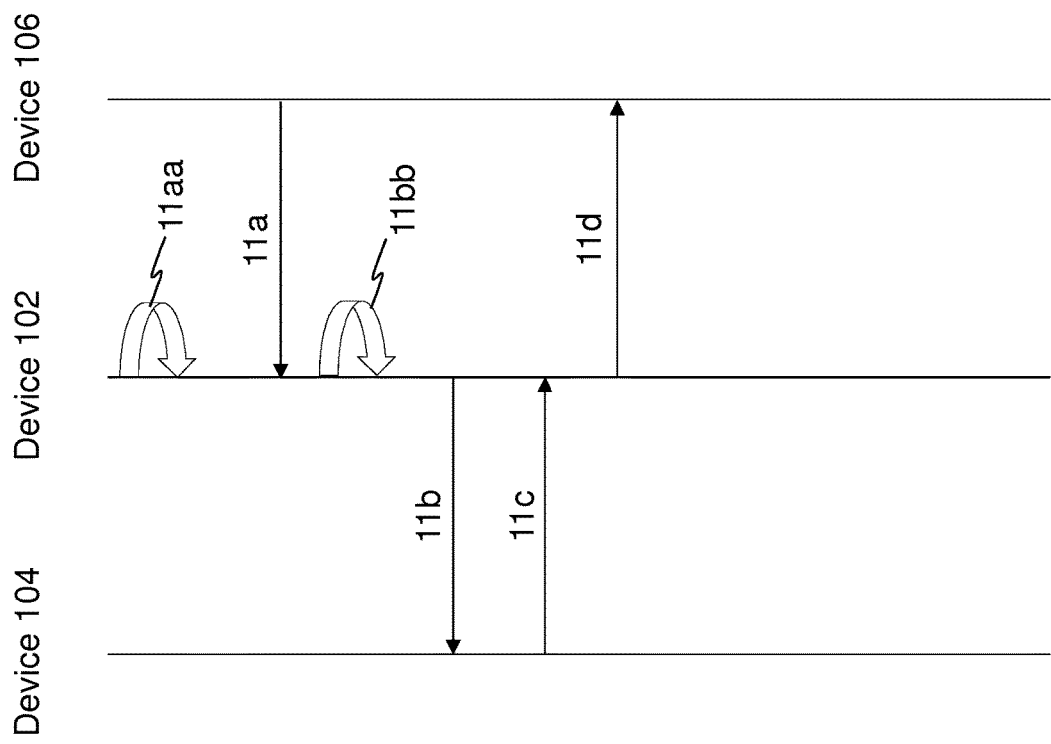
FIG. 12 shows a flow diagram according to one or more disclosed embodiments.

FIG. 12 shows a flow diagram involving processing of data according to the embodiments of FIG. 11. In step 11*aa*, device 102 is configured to snoop control packets of the predetermined control plane protocol. The predetermined control plane protocol is operated by a plurality of other devices (including device 104 and device 106) in network 1100 to obtain Layer 2 information on the basis of known Layer 3 information. In embodiments, device 102 does not operate the predetermined control plane protocol in network 1100. In step 11*a*, a packet generated according to the predetermined control plane protocol is transmitted from device 106 and received at device 102. In step 11*bb*, in response to device 102 identifying that the snooped control packet transmitted from device 106 in step 11*a* was generated according to the predetermined control plane protocol, device 102 extracts, from the snooped control plane protocol packet, L3 information associated with device 106 on the basis of known Layer 2 information associated with device 106.

In step 11*b*, device 102 forwards a control message on to device 104. A packet generated according to the predetermined control plane protocol is then transmitted from device 104, received at device 102 in step 11*c* and then forwarded on to device 106 by device 102 in step 11*d*.

In the embodiments of FIG. 12, device 106 is directly connected to device 102; hence, such embodiments allow device 102 to discover L3 information of device 106 connected to it, whilst also allowing device 102 to remain invisible at L3 in the network.

In the embodiments of FIG. 12, the snooped control plane protocol packet may for example comprise a request packet generated according to the predetermined control plane protocol.

In the embodiments of FIG. 12, the extracted L3 information may for example comprise an IP address for device 106 connected to device 102. In embodiments, the known Layer 2 information associated with device 106 comprises a media access control (MAC) address for device 106.

Figure 13:
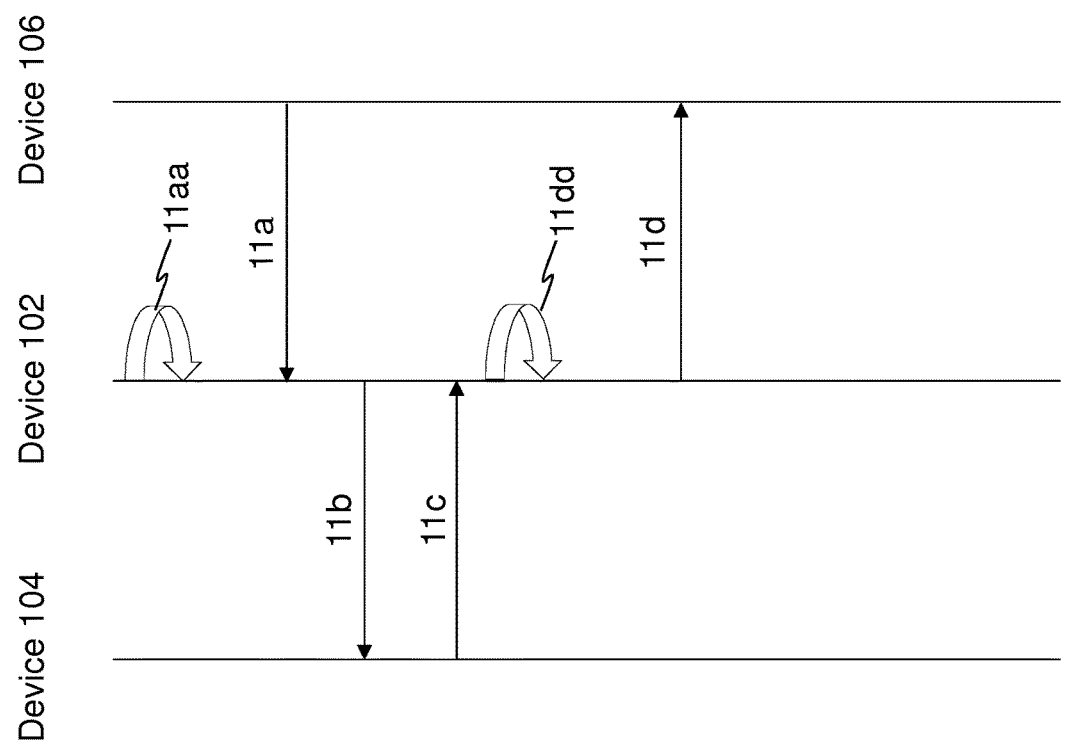
FIG. 13 shows a flow diagram according to one or more disclosed embodiments.

FIG. 13 shows a flow diagram involving processing of data according to the embodiments of FIG. 11. In step 11*aa*, device 102 is configured to snoop control packets of the predetermined control plane protocol. The predetermined control plane protocol is operated by a plurality of other devices (including device 104 and device 106) in network 1100 to obtain Layer 2 information on the basis of known Layer 3 information. In embodiments, device 102 does not operate the predetermined control plane protocol in network 1100. In step 11*a*, a packet generated according to the predetermined control plane protocol is transmitted from device 106 and received at device 102. In step 11*b*, device 102 forwards a control message on to device 104. A packet generated according to the predetermined control plane protocol is then transmitted from device 104, received at device 102 in step 11*c* and then forwarded on to device 106 by device 102 in step 11*d*.

In some embodiments of step 11*dd*, in response to device 102 identifying that the snooped control packet transmitted from device 104 in step 11*c* was generated according to the predetermined control plane protocol, device 102 extracts, from the snooped control plane protocol packet, L3 information associated with device 104 on the basis of known Layer 2 information associated with device 104. In such embodiments, device 102 extracts L3 information associated with device 104 which is the same device as the device from which the snooped control plane protocol packet was received.

In other embodiments of step 11*dd*, in response to device 102 identifying that the snooped control packet transmitted from device 104 in step 11*c* was generated according to the predetermined control plane protocol, device 102 extracts, from the snooped control plane protocol packet, L3 information associated with device 106 on the basis of known Layer 2 information associated with device 106. In such embodiments, device 102 extracts L3 information associated with device 106 which is a different device from device 104 from which the snooped control plane protocol packet was received.

In further embodiments of step 11*dd*, in response to device 102 identifying that the snooped control packet transmitted from device 104 in step 11*c* was generated according to the predetermined control plane protocol, device 102 extracts, from the snooped control plane protocol packet, L3 information associated with device 106 on the basis of known Layer 2 information associated with device 106 and also L3 information associated with device 104 on the basis of known Layer 2 information associated with device 104. In such embodiments, device 102 extracts L3 information associated with device 106 which is a different device from device 104 from which the snooped control plane protocol packet was received and device 102 also extracts L3 information associated with device 104 which is the same device as the device from which the snooped control plane protocol packet was received.

In the embodiments of FIG. 13, devices 104 and 106 are directly connected to device 102, hence, such embodiments allow device 102 to discover L3 information of device 104 and/or device 106 connected to device 102, whilst also allowing device 102 to remain invisible at L3 in the network.

In the embodiments of FIG. 13, the snooped control plane protocol packet may for example comprise a response packet generated according to the predetermined control plane protocol.

In the embodiments of FIG. 13, the extracted L3 information may for example comprise an IP address for device 106 connected to device 102 and/or an IP address for device 104 connected to device 102. In embodiments, the known Layer 2 information comprises a media access control (MAC) address associated with device 106 and/or device 104.

In embodiments, the predetermined control plane protocol comprises the Address Resolution Protocol (ARP).

In embodiments, one or more of device 104 and device 106 is directly connected to device 102 in the network.

In embodiments, the configuring comprises configuring the first device to snoop request packets generated according to the predetermined control plane protocol which are transmitted from the second device.

In embodiments, the configuring comprises configuring the first device to snoop response packets generated according to the predetermined control plane protocol which are transmitted towards the second device.

In conjunction with any of the embodiments described above, on the basis of at least a determined IP address and/or extracted L3 information of a device connected to it, device 102 may perform one or more of the following operations in the network: debugging one or more potential device misconfigurations, providing diagnostics data, flow monitoring, and load balancing.

In terms of debugging and diagnostic capabilities, if device 102 is aware of the IP addresses of any of its directly connected devices it can report more information about those devices to network operators, as well as debug potential misconfigurations with devices in mis-matched IP subnets.

In terms of flow monitoring, device 102 can use the IP address of a connected device for flow monitoring purposes. Device 102 can detect what flows are occurring and correlate this information at L3 as well as at L2.

In terms of providing extra routing intelligence to improve the performance of the network, with additional IP routing knowledge, device 102 can provide load balancing function for IP prefixes (to do this device 102 needs to identify its connected peers at the IP layer).

In embodiments, device 102 confirms whether a determined IP address and/or extracted L3 information of a device connected to it is valid by transmitting an Address Resolution Protocol (ARP) message from an address associated with device 102. The address associated with device 102 here may for example comprise a media access control (MAC) address for device 102. Such ARP messages may be transmitted at regular intervals to ensure validity of determined IP addresses and/or detect any changes/updates to such.

In any of the embodiments described above, device 102 may comprise a transit device (such a transit router) as opposed to a host device. In any of the embodiments described above, one or more of devices 104 and 106 may comprise a host device as opposed to a transit device.

The above embodiments are to be understood as illustrative examples of the present disclosure. Further embodiments of the present disclosure are envisaged.

In the embodiments of FIG. 8, steps 7*b* and 7*c* are depicted and described as occurring before steps 7*d* to 7*f*; in alternative embodiments, one or more of steps 7*d* to 7*f* occur before step 7*b* and/or step 7*c*. Similarly, in the embodiments of FIG. 10, steps 9*b* and 9*c* are depicted and described as occurring before steps 9*d* to 9*g*; in alternative embodiments, one or more of steps 9*d* to 9*g* occur before step 9*b* and/or step 9*c*.

In embodiments, device 102 comprises a processor or processing system, as depicted by processor 102A in FIGS. 3, 5, 7, 9 and 11. In embodiments, the processing system comprises one or more processors and/or memory. Each device as described in relation to any of the embodiments described above may similarly comprise a processor and/or processing system. One or more of the aspects of the embodiments described herein with reference to the drawings comprise processes performed by device 102. In embodiments, device 102 comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

What is claimed is:

1. A method of processing data in a packet-switched network, the method comprising:
   receiving, at a first device in the network, a data packet transmitted from a second device in the network, the received data packet comprising an Internet Protocol (IP) address for a third device in the network, wherein the first device comprises a Layer 2 switch;
   at the first device, initiating lookup, on the basis of the IP address for the third device comprised in the received data packet, in an IP routing table of the second device to obtain a next-hop IP address for the received data packet; and
   determining the obtained next-hop IP address to be an IP address of a device directly connected to the first device.

2. The method of claim 1, wherein the device directly connected to the first device comprises a different device to the third device.

3. The method of claim 2, wherein the third device is reachable in the network from the device connected to the first device.

4. The method of claim 1, wherein the device connected to the first device comprises the third device.

5. The method of claim 1, wherein the IP address comprised in the received data packet comprises a destination address for the received data packet.

6. The method of claim 1, wherein the determination is performed at a software defined networking (SDN) controller device in the network, and the method comprises receiving, at the first device, the obtained next-hop IP address from the SDN controller device.

7. The method of claim 6, wherein the initiating comprises transmitting a lookup request to the SDN controller device, the SDN controller device having access to the IP routing table of the second device in the network.

8. The method of claim 7, wherein the lookup request transmitted to the SDN controller device comprises the IP address for the third device.

9. The method of claim 6, wherein the first device does not have access to the IP routing table of the second device.

10. The method of claim 1, wherein the determination is performed at the first device.

11. The method of claim 10, wherein the first device has access to the IP routing table of the second device and the initiating comprises transmitting a lookup request from the first device to the second device.

12. The method of claim 1, wherein the received data packet comprises a payload data.

13. The method of claim 1, wherein the first device comprises a device which does not operate an IP in the network.

14. The method of claim 1, wherein at least one of the second device and the device connected to the first device comprises a device which operates an IP in the network.

15. The method of claim 1, wherein at least one of the second device and the device connected to the first device comprises a Layer 3 device.

16. The method of claim 1, wherein the second device is directly connected to the first device in the network.

17. The method of claim 1, comprising, on the basis of at least the determined IP address of the device connected to the first device, performing one or more of the following operations in the network:
   debugging one or more potential device misconfigurations,
   providing diagnostics data,
   flow monitoring, and
   load balancing.

18. The method of claim 1, comprising forwarding the received data packet on towards the third device in the network.

19. The method of claim 1, wherein the received data packet is received via a packet snooping operation.

20. The method of claim 1, comprising confirming whether the determined IP address of the device connected to the first device is valid by transmitting an Address Resolution Protocol (ARP) message from an address associated with the first device.

21. The method of claim 1, wherein the address associated with the first device comprises a media access control (MAC) address for the first device.

22. A system for use in processing data in a packet-switched network, the system comprising:
   at least one memory including computer program code;
   at least one processor in communication with the memory, wherein the processor is configured to,
   receive, at a first device in the network, a data packet transmitted from a second device in the network, the received data packet comprising an Internet Protocol (IP) address for a third device in the network, wherein the first device comprises a Layer 2 switch;
   at the first device, initiate lookup, on the basis of the IP address for the third device comprised in the received data packet, in an IP routing table of the second device to obtain a next-hop IP address for the received data packet; and
   determine the obtained next-hop IP address to be an IP address of a device directly connected to the first device.

23. A non-transitory computer-readable storage medium having computer readable instructions stored thereon, wherein, when executed by a processor, cause a computing device to perform a method for processing data in a packet-switched network, the method comprising:
   receiving, at a first device in the network, a data packet transmitted from a second device in the network, the received data packet comprising an Internet Protocol (IP) address for a third device in the network, wherein the first device comprises a Layer 2 switch;
   at the first device, initiating lookup, on the basis of the IP address for the third device comprised in the received data packet, in an IP routing table of the second device to obtain a next-hop IP address for the received data packet; and
   determining the obtained next-hop IP address to be an IP address of a device directly connected to the first device.

* * * * *